United States Patent
Kondoh

(10) Patent No.: US 8,577,566 B2
(45) Date of Patent: Nov. 5, 2013

(54) DRIVING INSTABILITY DETERMINATION DEVICE

(75) Inventor: Takayuki Kondoh, Machida (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 13/820,105

(22) PCT Filed: Apr. 24, 2012

(86) PCT No.: PCT/JP2012/002815
§ 371 (c)(1),
(2), (4) Date: Feb. 28, 2013

(87) PCT Pub. No.: WO2012/157192
PCT Pub. Date: Nov. 22, 2012

(65) Prior Publication Data
US 2013/0166159 A1    Jun. 27, 2013

(30) Foreign Application Priority Data
May 18, 2011 (JP) .................................. 2011-111914

(51) Int. Cl.
*G06F 19/00* (2011.01)

(52) U.S. Cl.
USPC ................ 701/51; 701/43; 701/57; 180/65.8; 180/65.27; 180/65.28; 180/65.29; 180/65.285; 318/7; 318/139; 307/10.1; 706/900

(58) Field of Classification Search
USPC ......... 701/43, 51, 57; 180/65.8, 65.27, 65.28, 180/65.29, 65.285, 170, 197, 242, 407, 443, 180/446; 903/903, 910, 946, 947; 318/7, 318/139; 307/10.1; 706/900
See application file for complete search history.

(56) References Cited

U.S. PATENT DOCUMENTS

| | | | | |
|---|---|---|---|---|
| 5,679,092 A | * | 10/1997 | Otsubo et al. | 477/97 |
| 5,680,122 A | * | 10/1997 | Mio | 340/932 |
| 8,315,757 B2 | * | 11/2012 | Yamamura et al. | 701/29.1 |
| 8,494,714 B2 | * | 7/2013 | Kuge et al. | 701/36 |
| 2004/0167695 A1 | * | 8/2004 | Braeuchle et al. | 701/41 |
| 2010/0318254 A1 | * | 12/2010 | Yamamura et al. | 701/29 |
| 2012/0041641 A1 | * | 2/2012 | Kuge et al. | 701/36 |

FOREIGN PATENT DOCUMENTS

| | | |
|---|---|---|
| JP | 2006-343904 A | 12/2006 |
| JP | 2008-243031 A | 10/2008 |
| JP | 2009-9495 A | 1/2009 |
| JP | 2009-175929 A | 8/2009 |
| JP | 2011-59856 A | 3/2011 |
| JP | 2011-59857 A | 3/2011 |

* cited by examiner

*Primary Examiner* — McDieunel Marc
(74) *Attorney, Agent, or Firm* — Global IP Counselors, LLP

(57) ABSTRACT

A driving instability determination device is provided to improve the precision in detecting the driving instability. The driving state determination section determines whether the state is a prescribed driving state by determining whether the information of the operation state of the driving operation unit and the vehicle state as the running state data is disturbed. Based on the running state data for detecting the unstable state of the driver, the running state distribution computing section excludes the running state data when the state is determined to be the prescribed driving state, and the running state distribution computing section computes the first and second running state distributions in different time ranges. The driving instability determination section determines the instability of the driving from the difference between the two computed running state distributions.

20 Claims, 10 Drawing Sheets

| Operation State | | Selection | |
|---|---|---|---|
| Item | Detection Subject | Second Driving State | First Driving State |
| Environment | Road Surface Input | | ✓ |
| Environment | Tunnel | | ✓ |
| Environment | Merging/Branching Road, Jct. | | ✓ |
| Environment | Curve | | ✓ |
| Environment | Toll Gate | | ✓ |
| Environment | Preceding & Following G (Sloped Road) | | ✓ |
| Operation | Lane Change | ✓ | |
| Operation | A/B Pedal Operation | ✓ | |
| Operation | Blinker Operation | ✓ | |
| Operation | Navigation/Audio Operation | ✓ | |

FIG. 4

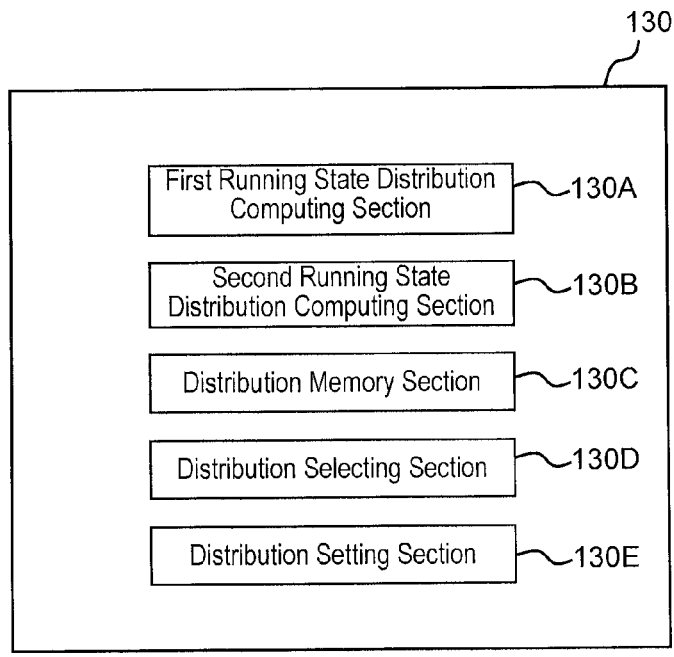

FIG. 5

| Key | Name |
|---|---|
| $\tilde{\theta}n$ | $\theta$ n – tilde Smoothing Value of Steering Angle |
| $\hat{\theta}n$ | $\theta$ n – hat Estimated Value of Steering Angle |

| Class bi | Range of Steering Angle Predicted Error $\theta$ | Probability pi |
|---|---|---|
| b1 | $-\infty \sim -5\alpha$ | p1 |
| b2 | $-5\alpha \sim -2.5\alpha$ | p2 |
| b3 | $-2.5 \sim -\alpha$ | p3 |
| b4 | $-\alpha \sim -0.5\alpha$ | p4 |
| b5 | $-0.5\alpha \sim 0.5\alpha$ | p5 |
| b6 | $0.5\alpha \sim \alpha$ | p6 |
| b7 | $\alpha \sim 2.5\alpha$ | p7 |
| b8 | $2.5\alpha \sim 5\alpha$ | p8 |
| b9 | $5\alpha \sim \infty$ | p9 |

FIG. 12

| Driving State | | Selection | |
|---|---|---|---|
| Item | Detection Subject | First Driving State | Second Driving State |
| Environment | Cut-In | ✓ | |
| Environment | Change In Highway Type | ✓ | |
| Environment | Merging/Branching Road, Jct. | ✓ | |
| Environment | Toll Gate | ✓ | |
| Environment | Traffic Jam | ✓ | |
| Operation | A/B Pedal Operation | | ✓ |
| Operation | Blinker Operation | | ✓ |

FIG. 13

| Driving State | | Selection | | |
|---|---|---|---|---|
| Item | Detection Subject | Second Driving State | Change | First Driving State |
| Environment | Road Surface Input | | ← | ✓ |
| Environment | Tunnel | | ← | ✓ |
| Environment | Merging/Branching Road, Jct. | | ← | ✓ |
| Environment | Curve | | ← | ✓ |
| Environment | Toll Gate | | ← | ✓ |
| Environment | Preceding & Following G (Sloped Road) | | ← | ✓ |
| Operation | Lane Change | ✓ | | |
| Operation | A/B Pedal Operation | ✓ | | |
| Operation | Blinker Operation | ✓ | | |
| Operation | Navigation/Audio Operation | ✓ | | |

FIG. 15

DRIVING INSTABILITY DETERMINATION DEVICE

CROSS-REFERENCE TO RELATED APPLICATIONS

This application is a U.S. National stage application of International Application No. PCT/JP2012/002815, filed Apr. 24, 2012, which claims priority claims priority under to Japanese Patent Application No. 2011-111914, filed in Japan on May 18, 2011, the entire contents of which is hereby incorporated by reference.

FIELD OF THE INVENTION

The present invention relates to a technology for determining the driving instability related to the unstable state of the driving operation of the driver.

BACKGROUND INFORMATION

Japanese Laid Open Patent Application No. 2009-9495 describes a vehicle driving supporting system, wherein based on the steering operation, a long-time running state distribution corresponding to an overall driving characteristics and a short-time running state distribution corresponding to a current driving characteristics are computed; from the magnitude of a difference between the two computed distributions, an instability of the driving state is determined. According to the description in Japanese Laid Open Patent Application No. 2009-9495, this system can detect the instability of the state of driving with a high degree of precision and independent of the surrounding traffic.

SUMMARY

However, according to the scheme described in Japanese Laid Open Patent Application No. 2009-9495, detection is made only for the steering operation of the driver with the instability of the driving state, yet a disturbance in the steering operation may also take place due to other factors different from the instability of the driving operation. In such cases, the precision of the detection of the unstable driving state degrades.

One object of the present invention is to provide a scheme to address this problem by increasing the detecting precision of the driving instability.

In order to realize the object described above, an embodiment of the present invention has a running state distribution computing section that computes a first running state distribution in a first time range and a second running state distribution in a second time range with the first running state distribution being longer than the second time range based on the running state data and a driving instability determination section that compares the first running state distribution and the second running state distribution computed by the running state distribution computing section to determine the driving instability. The running state distribution computing section excludes the running state data during a period determined to be a period in which the driving state is of a preset prescribed driving state (a current driving state determined to have a poor reliability for the running state data acquired from the running state acquisition section) in computing at least the second running state distribution among the first running state distribution and the second running state distribution.

According to an embodiment of the present invention, based on the running state data in the driving state excluding the prescribed driving state, at least the second running state distribution is computed. As a result, it is possible to improve the precision in detecting the operation instability.

BRIEF DESCRIPTION OF THE DRAWINGS

Referring now to the attached drawings, which form a part of this original disclosure, the drawings will be briefly described.

FIG. 4 is a diagram illustrating the relationship between the driving state and the selection of distribution.

FIG. 5 is a diagram illustrating the configuration of the running state distribution computing section.

FIG. 12 is a diagram illustrating the classification of the steering angle predicted error.

FIG. 13 is a diagram illustrating the relationship between the driving state and the distribution selection in the second modified example of the present invention.

FIG. 15 is a diagram illustrating the relationship between the driving state and the distribution selection in the third modified example of the present invention.

DETAILED DESCRIPTION OF THE EMBODIMENTS

First of all, the first embodiment of the present invention will be explained with reference to the figures.

Figure 1:
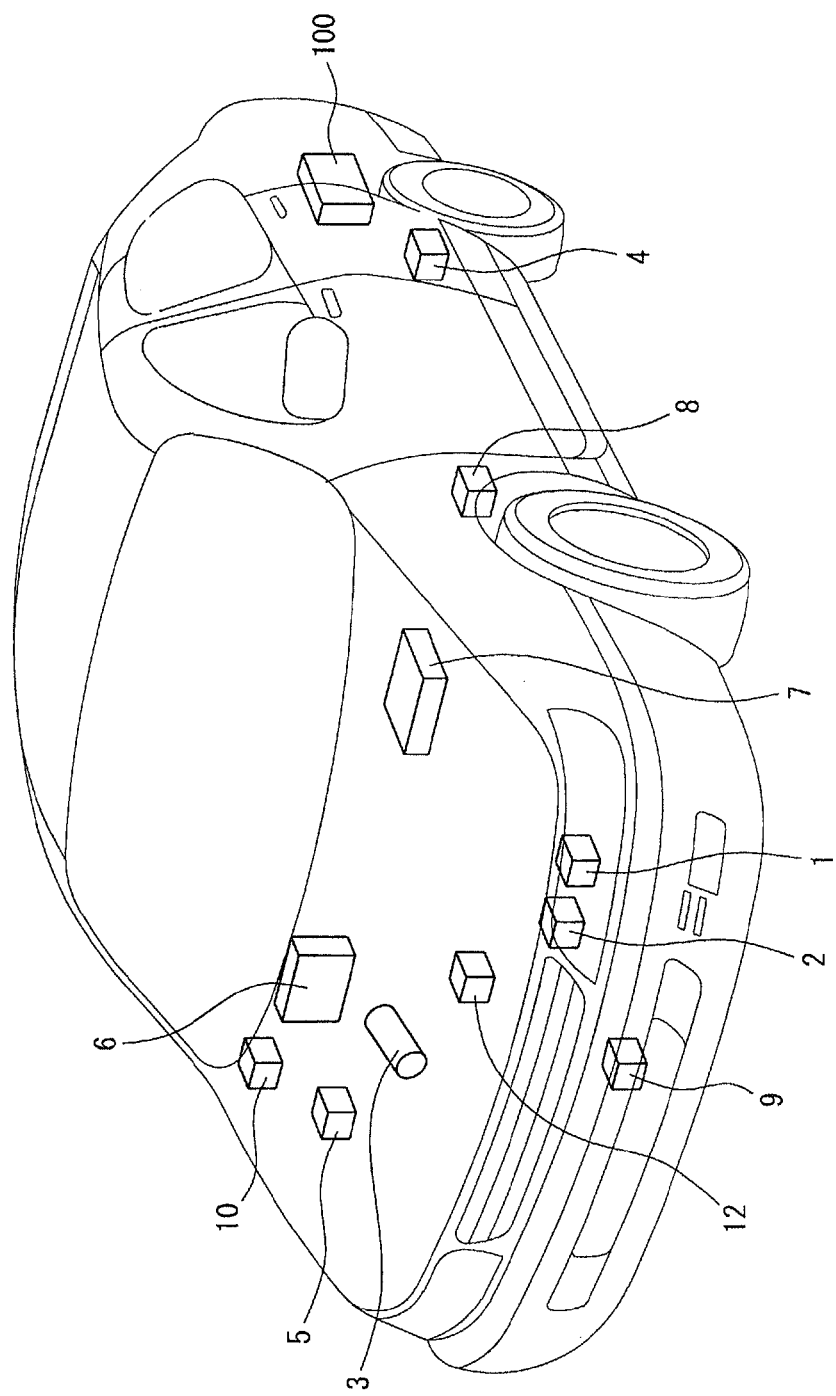
FIG. 1 is a diagram illustrating the configuration of the vehicle related to an embodiment of the present invention.

FIG. 1 is a diagram illustrating the configuration of a vehicle that carries a vehicle information providing device related to this embodiment of the present invention.

As shown in FIG. 1, the vehicle in this embodiment has an accelerator pedal position sensor 1, a brake pedal operation amount sensor 2, a steering angle sensor 3, a wheel velocity sensor 4, a blinker detecting sensor 5, a meter display 6, a navigation system 7, a G sensor 8, a shift sensor 12, a preceding vehicle detecting device 9, and a controller 100. For the vehicle in which the present invention is adopted, there is no need to equip the vehicle with all of the sensors described above. The sensors here are also presented in consideration of the other embodiments.

The accelerator pedal position sensor 1 detects the accelerator pedal position (the acceleration instruction amount). The detected position is output to the controller 100.

The brake pedal operation amount sensor 2 detects the brake pedal operation amount (the brake instruction amount). The detected brake pedal operation amount is output to the controller 100.

The steering angle sensor 3 is an angle sensor attached near the steering column or the steering wheel (not shown in the figure). From the rotation of the steering shaft, the steering angle due to the turning of the steering wheel by the driver is detected. The detected steering angle is output to the controller 100.

The wheel velocity sensor 4 detects the vehicle speed by detecting a rotation velocity of the wheels. The detected vehicle speed is output to the controller 100. The wheel velocity sensor 4 can also detect the vehicle speed based on the signal sent to the meter display 6.

The blinker detecting sensor 5 detects the blinker state of the blinker lever. The detected blinker state is output to the controller 100.

The shift sensor 12 is arranged on the shift lever or the transmission, and the shift sensor detects the shift position signal (the transmission information). The detected shift position information is output to the controller.

The information display device displays an alarm corresponding to the control signal of the controller 100 by voice or an image. For example, the information display device has a speaker 10 that provides information by a buzzer or voice to the driver and a display unit that provides information through a picture or text. The display unit may be the display unit of the navigation system 7 used concurrently.

The navigation system 7 has a GPS receiver, a map database, a display unit, etc. The navigation system is a system for route searching and route guide, etc. The navigation system 7 acquires the information about the type of the road, the width of the road, etc. where the vehicle runs based on the current location of the vehicle obtained by the GPS receiver and the road information stored in the map database.

The G sensor 8 detects the longitudinal acceleration and the lateral acceleration generated in the vehicle. The detected accelerations are output to the controller 100.

The preceding vehicle detecting device 9 detects the information of the other vehicles and the other obstacles preceding the vehicle in the moving direction. According to the present embodiment, the distance to the obstacle is detected. The preceding vehicle detecting device 9 is made of, for example, a laser range finder. The detected distance is output as the information of the inter-vehicle distance, the inter-vehicle time, the relative speed, etc. to the controller 100.

The controller 100 is an electronic controller comprising a CPU, a ROM, a RAM and other CPU peripheral parts. The controller 100 has a driving supporting section 100A that carries out treatment for determining the driving instability to provide the information to the driver. Among the treatments by the controller 100, the driving supporting section 100A carries out the following treatment: based on the signals detected by the accelerator pedal position sensor 1, the brake pedal operation amount sensor 2, and the steering angle sensor 3, etc., the driving characteristics of the driver are analyzed, and the degree of the driving instability, such as the disturbance in the driving operation of the driver, etc., is determined. Then, corresponding to the degree of the driving instability, an alarm or other information is displayed to the driver to call the attention of the driver.

Figure 2:
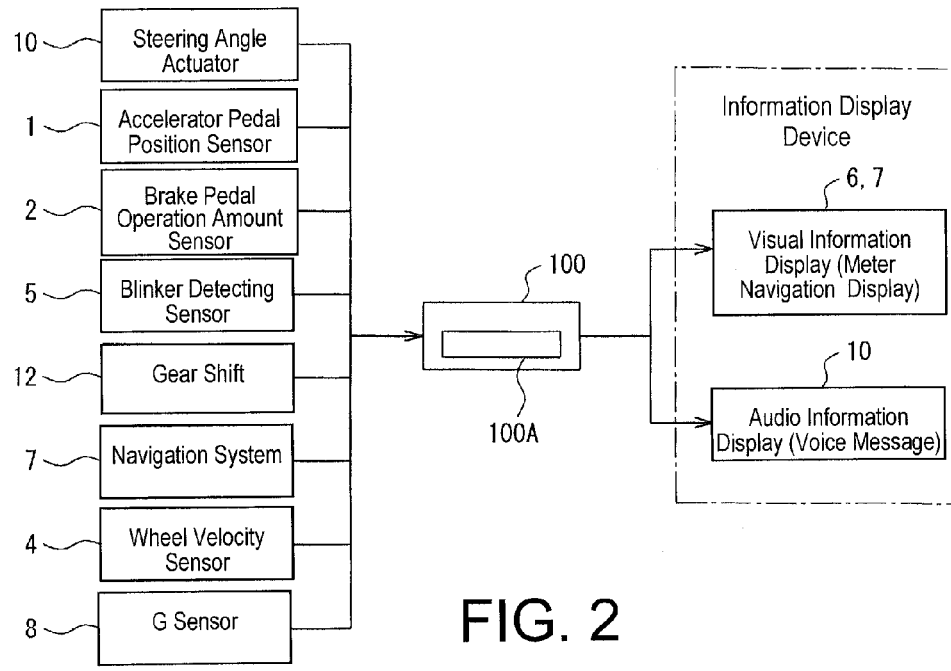
FIG. 2 is a diagram illustrating an example of the configuration of the vehicle information providing device.

FIG. 2 is a diagram illustrating an example of the configuration of the system of the vehicle information providing device containing the driving supporting section 100A in this embodiment. Here, as shown in FIG. 2, the vehicle information providing device of the present embodiment takes the running state data as the information from the steering angle sensor 3. As the information display device, a visual information display device and an audio information display device are presented as examples. For example, the visual information display device is the meter display 6 or the display section of the navigation system 7. The audio information display device is the speaker 10 as an example.

Figure 3:
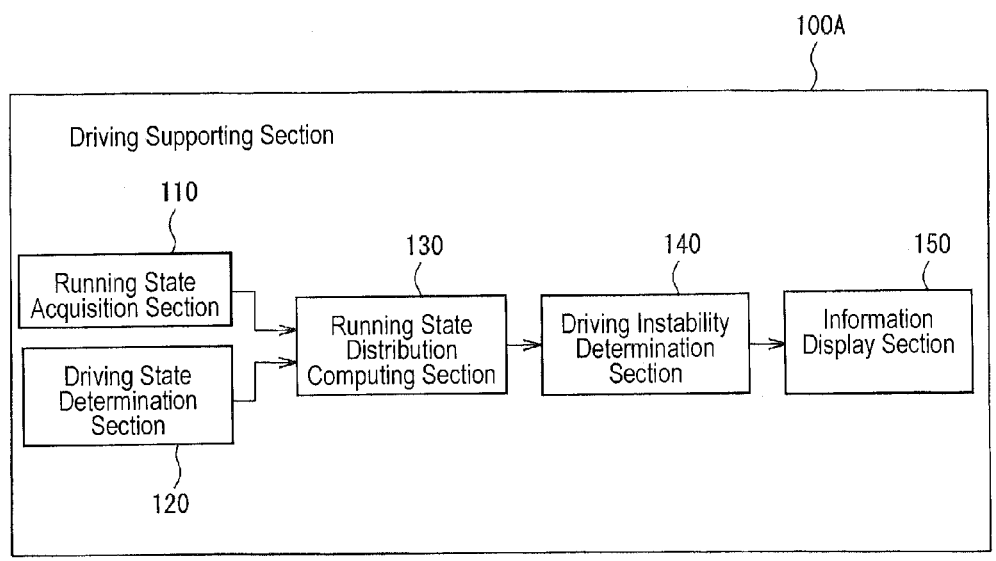
FIG. 3 is a diagram illustrating the configuration of the driving supporting section.

As shown in FIG. 3, the driving supporting section 100A has a running state acquisition section 110, a driving state determination section 120, a running state distribution computing section 130, a driving instability determination section 140, and an information display section 150.

Here, the running state acquisition section 110 acquires the running state data comprising the driving state of the driving operation unit that can be operated by the driver and/or the vehicle state. According to the present embodiment, an explanation will be made on an example in which the steering information, that is, the information of the operation state of the driving operation unit that can be operated by the driver, is adopted as the running state data to be detected for determining the operation characteristics. That is, the running state acquisition section 110 according to the present embodiment computes the running state data by using the steering angle information as the running state data.

Here, as the information that can lead to the running state data, in addition to the steering information, there are other types of information, which will be explained later, such as the inter-vehicle information (the inter-vehicle distance or the inter-vehicle time) with respect to the preceding vehicle, the acceleration/deceleration information based on the operation on the accelerator pedal or the brake pedal, etc. In order to compute the running state distribution and the difference between the distributions using these running state data, for example, the well-known method described in, for example, International Laid-Open Patent Application No. WO2009/013815 (Japanese Laid-Open Patent Application No. 2009-524342), etc. can be adopted.

The driving state determination section 120 determines the driving state of the vehicle being driven. More specifically, the driving state determination section 120 determines the operation state of the driving operation unit, which is an operation unit having the information other than the steering angle information as the running state data, and the driving state from the road environment. The driving state determination section 120 determines the vehicle state and/or the information of the navigation system. The navigation system acquires the information from around the vehicle. Here, the information from around the vehicle may be collected by cameras.

In addition, the driving state determination section 120 determines whether the determined current driving state is the prescribed driving state in which disturbance takes place in the operation state of the driving operation unit and the information of the vehicle state as the running state data described above, that is, the prescribed driving state determined to be a disturbance in the information of the running state data described above. The driving state determination section 120 of the present embodiment determines whether the driving state is the prescribed driving state in which there is a disturbance in the steering angle information.

According to the present embodiment, the first driving state and the second driving state are set as the "prescribed driving state determined to have a disturbance in the steering angle information." The first driving state refers to the driving state that takes place when the vehicle runs in a preset prescribed road environment. The second driving state refers to the driving state that takes place when the driver operates the preset prescribed driving operation unit.

The operation of the prescribed driving operation unit that can take place as the second driving state described above refers to at least one of the following operations: the lane change operation, the accelerating operation, the braking operation, the shift operation, and the navigation operation. The prescribed road environment that can lead to the generation of the first driving state described above refers to at least one of the following road environments: the road surface state, within a tunnel, at a merging/branching portion of roads, a curved road, near the toll gate, the yes/no of the another vehicle cutting in front of the vehicle, the type of highway, and the traffic jam state.

As shown in FIG. 4, the driving state determination section 120 acquires the operation information of the prescribed driving operation unit, such as the lane change operation, the brake pedal stepping operation, the blinker operation, the navigation system operation, and the audio system operation. In addition, as shown in FIG. 4, the driving state determination section 120 acquires the information of the prescribed road environment, such as the input of road surface worse than the preset road surface state, such as a roughened road surface, within a tunnel, a junction (JCT) or other merging/branching roads (in the interval within a prescribed distance before and after the merging/branching point), a curved road, a preset region including a toll gate, and a slope over the preset gradient.

Based on the operation information of the prescribed driving operation and the information of the prescribed road environment, the driving state determination section 120 in the present embodiment determines whether the state is the prescribed driving state in which the steering angle information as the running state data is disturbed by the factors other than the operation of the steering angle itself. That is, the driving state determination section determines whether the driving state has a degraded reliability in the steering information as the running state data. Here, a disturbance in the steering angle information refers to a degradation in the precision of the steering angle information (the running state data) due to the generation of a disturbance in the steering operation due to factors other than the operation instability.

Here, in the change lane operation, by the blinker operation and by detecting the lane line position, as well as the vehicle position and the moving direction of the vehicle, detection is made on whether the vehicle is in the lane change operation.

In the accelerator pedal operation, a determination is made based on the detected value of the accelerator pedal position sensor.

In the brake pedal stepping operation, a determination is made based on the detected value of the brake pedal stepping operation sensor.

In the blinker operation, a determination is made based on the detection of the blinker detecting sensor 5.

In the operation of the navigation system, a determination is made based on the signal from the navigation system.

In the audio operation, a determination is made based on the signal from the audio device.

The Yes/No of the input of the road surface state worse than the preset road surface state is determined based on the detected value of the wheel velocity sensor. For example, a determination is made based on the degree of disturbance in the detected value of the wheel velocity sensor. More specifically, for the input of the road surface state, the wheel velocity is measured once a preset prescribed time has passed (e.g., 10 ms), and the cut round value is compared with the last round value; when the difference becomes over a preset threshold, a determination is made that there is an input of the road surface state worse than the preset threshold. The Yes/No of the road surface state worse than the preset threshold may also be determined by the well-known treatment other than detection by the vehicle speed. For example, one may also adopt a scheme in which, based on the detected value of a sensor that detects the upper portion behavior, such as an acceleration sensor arranged on the vehicle body, a sensor that detects the stretching amount of the suspension shock absorber, or the like, the case of the generation of bouncing over a preset threshold is detected to detect the input of the road surface state.

The information about the in-tunnel state or the proximity to a toll gate is acquired from the navigation system.

The curved road is detected by the navigation system or from the steering angle. For example, when the duration in which the steering angle is over the preset value is found to be longer than a preset time, a determination is made that the road is a curved road.

The slope is detected from the road surface gradient detected by the G sensor.

Here, as explained above, according to the present embodiment, a first driving state and a second driving state are set as the prescribed driving state, that is, the driving state in which an external disturbance is input to the measurement of the unstable state of driving, that is, the driving state in which the precision of the steering angle information degrades. According to the first driving state, when the state is the prescribed driving state with a disturbance in the steering angle information, even after the disappearance of the prescribed driving state, the driving state still assumes the continuation of the driving state of the driver before the generation of the prescribed driving state. According to the second driving state, depending on the prescribed driving state with a disturbance in the steering angle information, an assumption is made that the driver's driving state after the disappearance of the prescribed driving state is different from that before the generation of the prescribed driving state. As shown in FIG. 4, the first driving state refers to the prescribed driving state determined based on the road environment system, and the second driving state refers to the prescribed driving state determined based on the operation system. The reason for this is as follows.

When the instability is determined by determining the running state distribution based on the steering angle and when the driver makes any active operation to have a different steering angle, the state after that is taken as a change in the driver's driving state. For example, consider the case when the lane change operation is carried out. In this case, during the period of the lane change operation, factors other than the uneasiness of the driver (drift) may take place. In addition, it is quite possible that a change amount may enter the value of the steering operation precision right before the lane change operation due to factors other than the instability originally detected. That is, when the lane change operation is made, the driver looks at the mirrors to check the rear and flank sides, or the driver turns his/her body to directly watch the rear and flank sides. Such maneuvering has an adverse influence on the steering operation. As a result, during the checkup period before the lane change operation, the reliability of the steering operation information is lower. Consequently, the steering operation information in this period right before the lane change operation is preferred to also be removed in addition to the period of the prescribed driving state when the lane change operation is carried out. However, detecting when the driver would look around to make a lane change is difficult, thus, is difficult to detect correctly. As a result, determining beforehand the start of the checkup period that takes place before the lane change operation is also difficult. Consequently, when the second driving state is determined based on the steering information, the reliability of the steering operation information before the determination of the second driving state can possibly be low.

When the prescribed driving state takes place due to the road environment, a temporary change in the driving state is assumed; after the end of the prescribed driving state, the driver's driving state before the prescribed driving state caused by the road environment is assumed to be resumed. When the first driving state is determined based on the road environment, an assumption is made that there is a high reliability for the steering operation information before the determination of the prescribed driving state.

Based on the running state data acquired by the running state acquisition section 110 and the driving state determined by the driving state determination section 120, the running state distribution computing section 130 computes the plural running state distributions in different time ranges. According to the present embodiment, the running state distribution computing section 130 computes the first running state distribution determined according to the steering angle information acquired in the first time range that is preset relatively longer and the second running state distribution in the second time range that is shorter in time than the first running state distribution.

In this case, for the running state distribution computing section 130 in the present embodiment, based on the driving state determined by the driving state determination section 120, the running state data in the period determined to have the driving state of the prescribed driving state is excluded, and the second running state distribution described above is computed. The running state distribution computing section 130 of the present embodiment may also have a configuration in which the running state distribution computing section has the running state data in the period determined to be the prescribed driving state excluded, and the running state distribution computing section computes the first running state distribution. Here, the following scheme is preferred: even when the running state data of the period in which the driving state is determined to be the prescribed driving state is excluded, the duration of the time range for determining the second running state distribution will be the same as the second time range. Here, the following scheme may also be adopted: when the running state data of the period in which the driving state is determined to be the prescribed driving state is excluded, the duration of the time range in which the second running state distribution is determined is different from that of the second time range; for example, the duration is set with a longer time interval as the second time range.

Here, the first time range that is preset and is relatively longer is the time interval where it is possible to realize the normal operation characteristics for the driver as the subject, and the first time range is set at, for example, 30 min. The second time range of the second running state distribution is the time interval where determining the current driving characteristics (the nearest driving characteristics) is possible, and the time interval is set to go back by, for example, 3 min from the current time point. The time intervals presented above are merely examples, and they should be set according to experimental or theoretical theory based on the acquisition period of the steering information. According to the present embodiment, the steering angle information is acquired once every preset sampling interval (100 msec).

For each running state distribution, each time when the steering angle is acquired as the running state data, the running state distribution computing section 130 updates the data stored for computing each running state distribution (the frequency distribution, etc.); at the same time, each running state distribution is updated (computed). Here, excluding the running state data in the period in which a determination is made that the driving state is of the prescribed driving state, among the first and second running state distributions, at least the second running state distribution is computed. The treatment for excluding the running state data described above in the period in which the driving state is determined to be the prescribed driving state is carried out as follows and as to be explained later: with the prescribed driving state and the data before the determination, the data when the prescribed driving state is determined are overwritten, or, when the prescribed driving state is determined, updating of the data described above is stopped.

Here, as the driving state determined by the driving state determination section 120, there are the following three driving states: the first driving state, the second driving state, and the third driving state, which is the normal driving state different from the first and second driving states. The first driving state and the second driving state are the prescribed driving state as explained above.

As shown in FIG. 5, the running state distribution computing section 130 has a first running state distribution computing section 130A, a second running state distribution computing section 130B, a distribution memory section 130C, a distribution selecting section 130D, and a distribution setting section 130E.

Based on the data successively updated as explained above, the first running state distribution computing section 130A computes the first running state distribution of the first time range that is relatively longer as described above.

Based on the successively updated data described above, the second running state distribution computing section 103B computes the second running state distribution in the second time range that is relatively shorter as explained above.

The distribution memory section 130C repeatedly computes the third running state distribution in the time interval for each of the preset third time ranges (e.g., an interval of 5 sec), and the distribution memory section has the computed third running state distribution in the memory section.

When the driving state determination section 120 determines that the state is one of the prescribed driving states, that is, the first driving state and the second driving state, based on whether the determined prescribed driving state is the first driving state or the second driving state, the distribution selecting section 130D selects either the third running state distribution or the first running state distribution stored before detection of the driving state.

With the third running state distribution or the first running state distribution as the running state distribution selected by the distribution selecting section 130D, the distribution setting section 130E changes the second running state distribution described above. More specifically, when the determined prescribed driving state is the first driving state, the distribution setting section 130E overwrites the second running state distribution in the first running state distribution. When the determined prescribed driving state is the second driving state, the distribution setting section overwrites the second running state distribution described above in the third running state distribution described above.

When the second running state distribution is substituted by the third running state distribution, the running state distribution computing section 130 has the running state data in the time range in the period in which the second driving state is determined substituted by the running state data determined in the nearest time interval with the same duration before the determination of the second driving state. Here, instead of the substitution of the running state data, one may also adopt a scheme in which process is carried out so that updating the data stored for computing the second running state distribution (the frequency distribution or the like) is prohibited during the period when the second driving state is determined. With this process, until the end of the determination of the second driving state and the lapse of the time of the second time range, the second running state distribution is computed from both the running state data in the time range before the determination of the second driving state and the running state data of the time interval after the determination; the sum time of the time interval before the determination of the prescribed driving state described above and the time interval after the determination is set as to be equal to the time of the second time range described above.

Based on the difference between the first running state distribution and the second running state distribution computed by the running state distribution computing section 130, the driving instability determination section 140 determines the instability of the driving.

Based on the instability of the driving determined by the driving instability determination section 140, the information display section 150 carries out the process for displaying the information to the driver.

Figure 6:
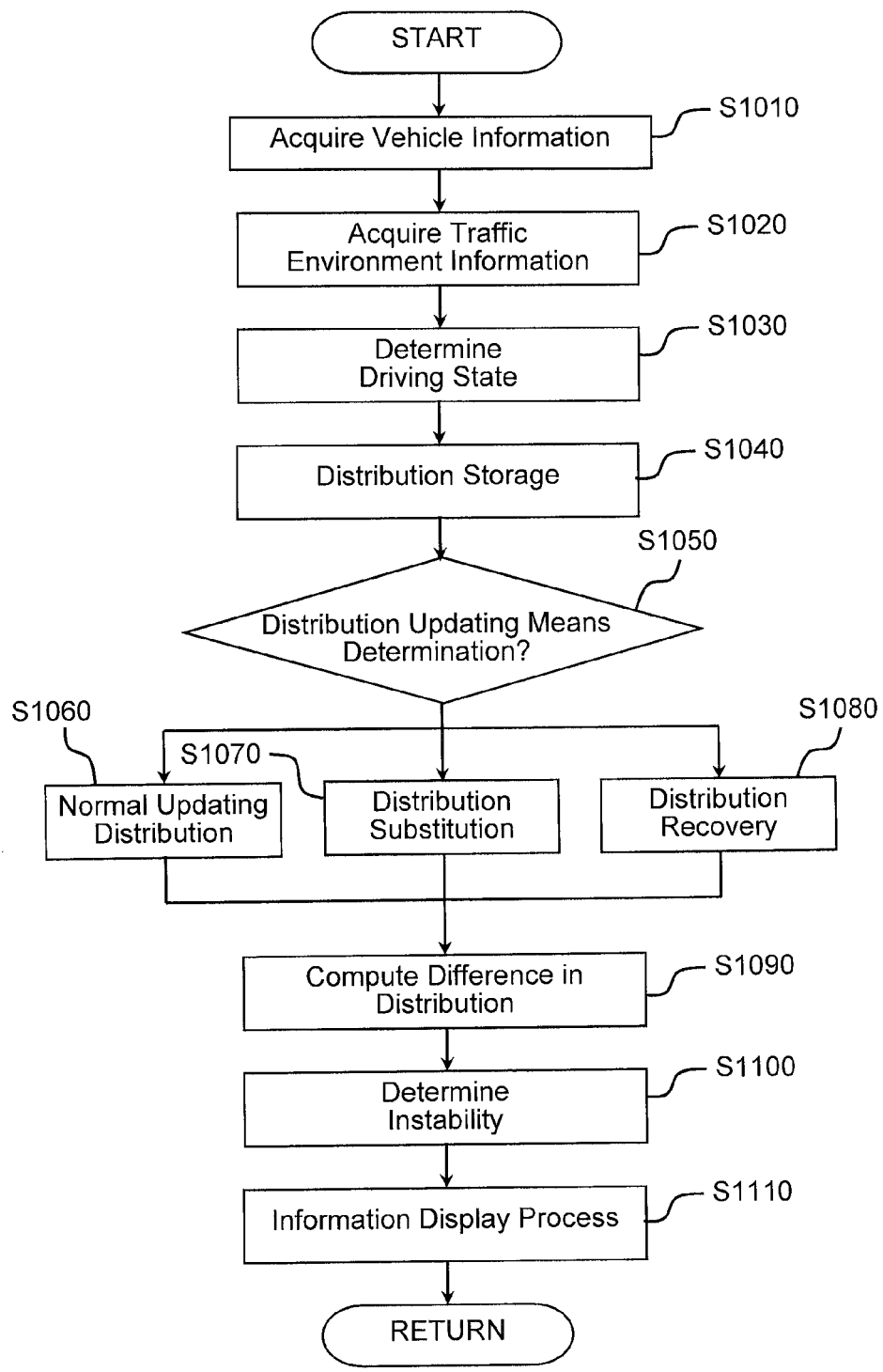
FIG. 6 is a diagram illustrating the treatment carried out by the driving supporting section related to the first embodiment of the present invention.

In the following, the process of the driving supporting section 100A described above will be explained with reference to FIG. 6. Here, the process of the driving supporting section 100A is carried out at the preset control period (e.g., for each 100 msec).

In step S1010, the driving supporting section 100A acquires the following data as the vehicle information data.

That is, as the operation information of the driving operation unit of the driver, as explained above, the information is acquired for the steering angle, the operation on the accelerator pedal and the brake pedal, the blinker operation, the shift operation, and the operation of the navigation and audio systems. Also, as the vehicle data system indicating the vehicle state, the information for the vehicle speed, the longitudinal G, the lateral G, and the wheel velocity is acquired.

Then, in step S1020, from the navigation system, the driving supporting section 100A acquires from the navigation system the information about the toll gate, the tunnel, the merging/branching roads, the curved road, and the sloped road as the traffic environment information and other road environment information as the information from around the vehicle. As these pieces of information, the map database information of the navigation system may be adopted.

Then, in step S1030, the driving state determination section 120 makes a determination of the driving state.

As the determination of the driving state, the yes/no is determined based on the input of the road surface state, the tunnel, the merging/branching of roads, the curved road, the toll gate, the sloped road (longitudinal G), the lane change operation, the operation of the accelerator pedal or brake pedal, the blinker operation, and the navigation/audio operation. If the determination result is YES, the instability computing method is selected. More specifically, based on FIG. 4, a determination is made regarding whether the driving state is the first driving state, the second driving state, or the normal driving state. Here, when both the first driving state and the second driving state are simultaneously detected as the prescribed driving state, the second driving state is taken as the priority.

Then, in step S1040, the distribution memory section 130C carries out the process for computing the third running state distribution and the process for storage. That is, the distribution memory section 130C has a counter, so that each time when the process of step S1040 is executed, the counter is counted up, and the running state data for preparing the running information distribution are stored. Then, when the preset count value is reached by the counter, by the running state data stored in the counting steps of the counter in this round, the third running state distribution is prepared and stored, and, at the same time, the counter is cleared.

In this way, in step S1030, the third running state distribution is computed as the third time range as the time interval for each of the preset third time ranges (e.g., 5 sec), and process is carried out to have the computed third running state distribution stored in the memory section.

Then, in step S1050, based on the driving state determined by the driving state determination section 120, the distribution selecting section 130D selects the adopted running state distribution. More specifically, in step S1050, a determination is made regarding whether the normal driving state, the first driving state and the second driving state is the driving state. Here, when a determination is made that the state is the normal driving state, the operation goes to step S1060. When a determination is made that the state is the first driving state, the operation goes to step S1080. When a determination is made that the state is the second driving state, the operation goes to step S1070.

Here, if it is impossible to detect the first and second running state distributions of the preset time interval, the state recovers as is.

Then, in step S1060, a selection is made regarding the first running state distribution and the second running state distribution computed by the first running state distribution computing section 130A and the second running state distribution computing section 130B as explained above. The operation then goes to step S1090.

Then, in step S1070, the second running state distribution is overwritten on the first running state distribution so that the second running state distribution is substituted. Then, the operation goes to step S1090.

In step S1080, the second running state distribution is substituted by the third running state distribution that stores the second running state distribution. Then, the operation goes to step S1090.

Here, as described above, the first running state distribution computing section 130A and the second running state distribution computing section 130B update the first running state distribution and the second running state distribution each time when the steering angle information is acquired as the running state data.

In step S1090, the steering entropy method is adopted to compute the difference between the distributions (the relative entropy), that is, between the first running state distribution and the second running state distribution (the second running state distribution after substitution when substitution is carried out). Then, the operation goes to step S1100.

More specifically, in step S1090, based on the steering angle signal when the driver carries out the steering operation, the difference is computed for determining whether the current driving operation of the driver is different from the normal driving operation, that is, whether the state is more unstable than the normal driving operation. That is, in step S1090, as the value representing the disturbance instead of the smooth driving operation, the relative entropy (the characteristic amount and instability) is computed. Usually, in the state when the attention of the driver is not concentrated on the driving operation, the time when steering cannot be carried out is longer than the time of the normal driving operation when the attention is concentrated on driving, and a significant error in the steering angle is accumulated. Consequently, the correction steering amount becomes larger when the attention of the driver is set back on driving. According to the present embodiment, this characteristic feature is exploited to compute the relative entropy RHp. More specifically, plural running state distributions in different time ranges, that is, the steering error distribution (the running state distribution) accumulated in the past or for a long time preceding the current time and the steering error distribution (the running state distribution) of the current driver, are computed, respectively. Here, the long-time steering error distribution taken as the normal driving characteristics is adopted as the comparison reference, and the relative entropy RHp is computed from the long-time steering error distribution and the current short-time steering error distribution.

Here, the relative entropy RHp is a physical amount representing the difference (the distance) between the 2 steering error distributions (the running state distributions), and the relative entropy shows the degree of the difference between the 2 steering error distributions, that is, the difference between the 2 steering error distributions. From the value of the computed relative entropy, it is possible to evaluate the stability of the running state near the current state with respect to the past long-time running state (the normal driving characteristics).

Examples of computing the first running state distribution (they steering error distribution) accumulated in a relatively long time, the second running state distribution (the steering error distribution) of the current driver acquired in a relatively short time, and the difference (the relative entropy) between the distributions using them will be described later.

Then, in step S1100, determination of the unstable driving state is carried out based on the difference. In step S1100 of the present embodiment, the difference computed in step S1090 and the preset determination threshold are compared with each other. Here, when the difference is larger than the determining threshold, the state is determined to be an unstable driving state. Then, the operation goes to step S1110.

In step S1110, when the state in which a determination is made regarding the unstable driving state in step S1100 lasts for a time over a preset instability determination threshold (e.g., 5 sec), the information display process is carried out. During the period in which the state is determined to be the prescribed driving state, the information display may be interrupted.

Figure 7:
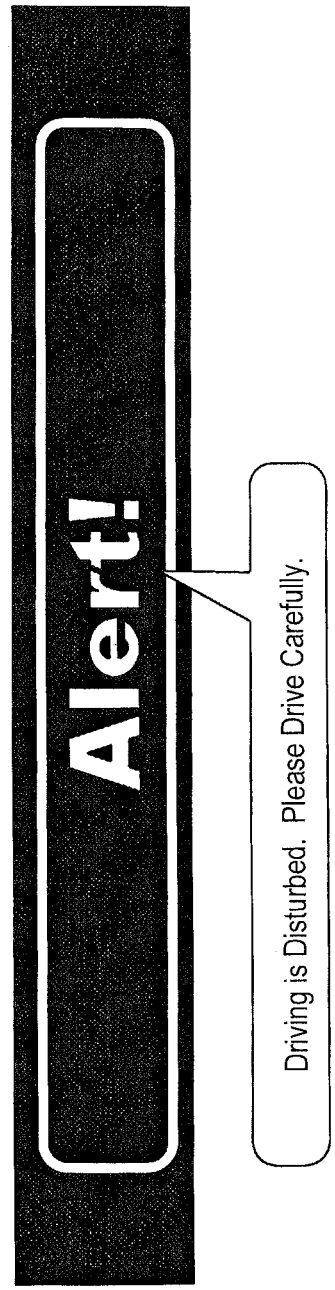
FIG. 7 is a diagram illustrating an example of the information display.

FIG. 7 is a diagram illustrating an example of the information display. In this example, together with the alarm display, the alarm voice stating "Driving is disturbed. Please be careful driving" or the like is played.

In the following, with reference to FIG. 8, an explanation will be made regarding the example of the process of computing the long-time accumulated steering error distribution (the running state distribution), the short-time acquired current driver's steering error distribution (the running state distribution), and the difference between the distributions (the relative entropy).

This process is carried out consecutively for a prescribed interval, for example, 50 msec.

In step S10, a determination is made regarding whether the running scene allows for the computing of the relative entropy RHp by determining (detecting) the running scene of the vehicle. Here, when the vehicle speed V is within the preset vehicle speed range (e.g., 40 to 120 km/h), the scene is taken as that allowing for the computing of the relative entropy RHp. That is, in order to compute the relative entropy RHp effectively using the steering angle signal, the case in which the vehicle speed is very low and the case in which the vehicle speed is very high are excluded from the running scene that allows for the computing operation.

In step S20, a determination is made regarding whether the current vehicle speed V detected by the wheel velocity sensor 4 is within the preset vehicle speed range. When the vehicle speed V is within the preset vehicle speed range, a determination is made that the running scene allows for the computing of the relative entropy RHp, and the operation goes to step S30 for computing the relative entropy RHp. On the other hand, when the vehicle speed V is not within the prescribed range, this process comes to an end.

In step S30, as the driving operation amount of the driver that becomes the detection subject for detecting the unstable state of the driving operation of the driver, the current steering angle signal θ detected by the steering angle sensor is read. In step S31, from the value of the steering angle signal θ that is read, the steering angle predicted error θe is computed.

Figures 8, 9:
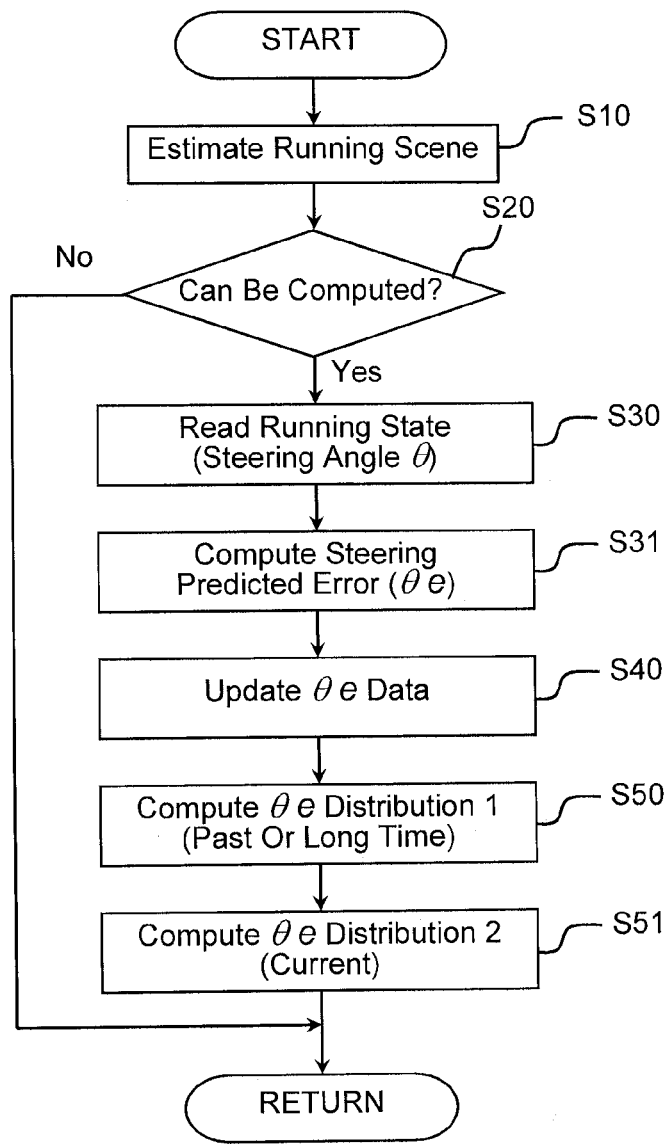
FIG. 8 is a diagram illustrating an example of computing the running state distribution using the relative entropy.
FIG. 9 is a diagram illustrating the keys adopted in computing the relative entropy.

Here, FIG. 9 shows the special keys and names adopted for computing the relative entropy RHp. The steering angle smoothing value θn—tilde is the steering angle that decreases the influence of the quantization noise. The steering angle's determined value θn—hat is the determined value of the steering angle at the sampling time assuming that the steering is carried out smoothly. The steering angle's determined value θn—hat can be obtained by the secondary Taylor development for the steering angle smoothing value θn—tilde as shown in the following Equation 1.

(Equation 1)

$$\hat{\theta}_n = \tilde{\theta}_{n-1} + (t_n - t_{n-1})\left(\frac{\tilde{\theta}_{n-1} - \tilde{\theta}_{n-2}}{t_{n-1} - t_{n-2}}\right) + \frac{(t_n - t_{n-1})}{2}\left(\frac{\tilde{\theta}_{n-1} - \tilde{\theta}_{n-2}}{t_{n-1} - t_{n-2}} - \frac{\tilde{\theta}_{n-2} - \tilde{\theta}_{n-3}}{t_{n-2} - t_{n-3}}\right)$$

In Equation 1, tn represents the sampling time of the steering angle θn.

The steering angle smoothing value θn—tilde is computed using the following listed Equation 2 as the average value of the 3 adjacent steering angles θn for decreasing the influence of the quantization noise.

(Equation 2)

$$\tilde{\theta}_{n-k} = \frac{1}{3}\sum_{i=-1}^{1} \theta_{n-kl+1}$$

In Equation 2, 1 represents the sample number of the steering angles θn contained in 150 msec when the computing time interval for the steering angle smoothing value θn—tilde is 150 msec, that is, when θn—tilde is taken as the minimum time interval that allows the intermittent manual operation by humans.

Suppose the sampling interval of the steering angle θn is Ts, the sample number 1 is represented by the following Equation 3.

$$a.\ I = \text{round}(0.15/Ts) \qquad \text{(Equation 3)}$$

With Equation 3, it is possible to determine the steering angle smoothing value θn—tilde based on the steering angles with an interval of 150 msec according to (k×1), where k=1, 2, or 3, and a total of 3 steering angles θn adjacent to them, respectively. Consequently, the steering angle's determined value θn—hat computed based on the steering angle smoothing value θn—tilde is computed from the steering angle signal θ obtained substantially at an interval of 150 msec.

At the sampling time, the steering angle predicted error θe can be computed using the following listed Equation 4 from the difference between the steering angle's determined value θn—hat when an assumption is made that the steering operation is carried out smoothly and the actual steering angle is θn.

1. $\theta_e = \theta_n - \hat{\theta}_n$ (Equation 4)

Here, the steering angle predicted error θe is computed with respect to the steering angle θn taken once for each 150 msec as the minimum time interval that allows for an intermittent manual operation.

In the following, the specific method for computing the steering angle predicted error θe will be explained. Here, as the sampling interval Ts of the steering angle signal θ, for example, 50 msec is adopted. First of all, the 3 adjacent steering angles θn with an interval of 150 msec from each other are adopted to compute the 3 steering angle smoothing values θn—tilde using the previously listed Equation 2. The 3 steering angle smoothing values θn—tilde are represented by the following Equation 5.

$\tilde{\theta}_{n-1} = \frac{1}{3}(\theta_{n-4} + \theta_{n-3} + \theta_{n-2})$.

$\tilde{\theta}_{n-2} = \frac{1}{3}(\theta_{n-7} + \theta_{n-6} + \theta_{n-5})$.

a. $\tilde{\theta}_{n-3} = \frac{1}{3}(\theta_{n-10} + \theta_{n-9} + \theta_{n-8})$. (Equation 5)

Then, using the 3 computed steering angle smoothing values θn—tilde, the steering angle's determined value θn—hat of the steering angle is computed using the previously listed Equation 1. Here, the steering angle's determined value θn—hat is represented by the following Equation 6.
a.

(Equation 6)

$$\hat{\theta}_n = \tilde{\theta}_{n-1} + Ts \cdot \frac{\tilde{\theta}_{n-1} - \tilde{\theta}_{n-2}}{Ts} + \frac{Ts}{2}\left(\frac{\tilde{\theta}_{n-1} - \tilde{\theta}_{n-2}}{Ts} - \frac{\tilde{\theta}_{n-2} - \tilde{\theta}_{n-3}}{Ts}\right) =$$
$$\tilde{\theta}_{n-1} + (\tilde{\theta}_{n-1} - \tilde{\theta}_{n-2}) + \frac{1}{2}\{(\tilde{\theta}_{n-1} - \tilde{\theta}_{n-2}) - (\tilde{\theta}_{n-2} - \tilde{\theta}_{n-3})\}$$

Then, the computed steering angle's determined value θn—hat and the actual steering angle signal θn are used to compute the steering angle predicted error θe from the previously listed Equation 4.

Then, in step S40, the data of the steering angle predicted error θe during a prescribed time T accumulated in the memory of the controller 100 and computed until the current time is added to the current value of the steering angle predicted error θe computed in step S31 so that the value is updated. That is, among the data of the steering angle predicted error θe accumulated there, the oldest data obtained T seconds ago are discarded, and, instead of them, the current value computed in step S31 is input as the newest data of the steering angle predicted error θe. As a result, the data of the steering angle predicted error θe from the current value until the value obtained T seconds ago are accumulated. Here, the prescribed time T is selected to be, for example, T equals 3600 sec (=1 h) so that the data can be accumulated over a sufficiently long period for computing the long-time error distribution as the comparison reference for determination of the unstable state of the current driving operation.

Figure 10:
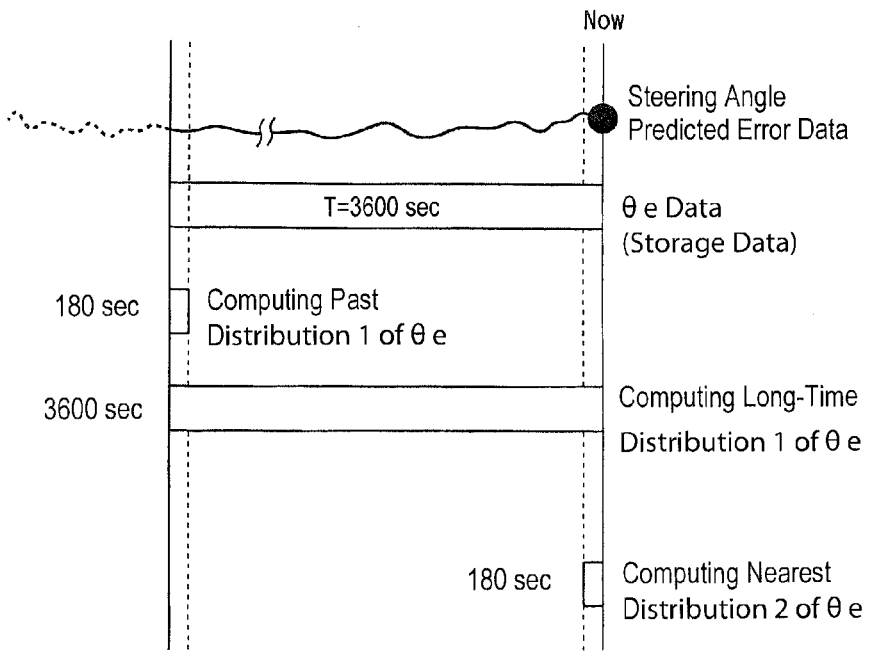
FIG. 10 is a diagram illustrating the method for computing the past distribution or the long-time distribution and the recent distribution from the steering angle predicted error data.

In step S50, the steering angle predicted error distribution 1 in the past or over a long time is computed. Here, as shown in FIG. 10, the data of 180 minutes from the data T seconds ago are adopted in computing the past steering angle predicted error distribution. More specifically, the accumulated past steering angle predicted error data θe are classified to 9 predicted error classes b1 to b9, and the probability pi (=p1 to p9) is determined for all of the degrees of the steering angle predicted error θe contained in each class bi. Then, the computed past distribution is adopted as a comparison reference of the steering predicted error distribution. Here, the range of the predicted error class bi is preset so that the values are constant for all of the classes b1 to b9.

When the long-time steering angle predicted error distribution is computed, all of the data of the 3600-second period from the time T seconds ago to the current time are adopted. More specifically, the accumulated long-time steering angle predicted errors θe are classified to 9 predicted error classes b1 to b9, and the probability pi (=p1 to p9) is determined for all of the degrees of the steering angle predicted error θe contained in each predicted error class bi. The computed past distribution (or the long-time distribution) is taken as the past (or the long-time) steering angle predicted error distribution 1 as the comparison reference.

In step S51, the current steering angle predicted error distribution 2 is computed. Here, the data in the period from the current time to the preceding 180 seconds, as shown in FIG. 10, are adopted to compute the current steering angle predicted error distribution 2. More specifically, the data of the preceding 180-second steering angle predicted error θe are classified to 9 predicted error classes b1 to b9, and the probability qi (=q1 to q9) is determined for all of the degrees of the steering angle predicted error θe contained in each predicted error class bi.

The operation described above is carried out repeatedly to allow for successive updating.

Figure 11:
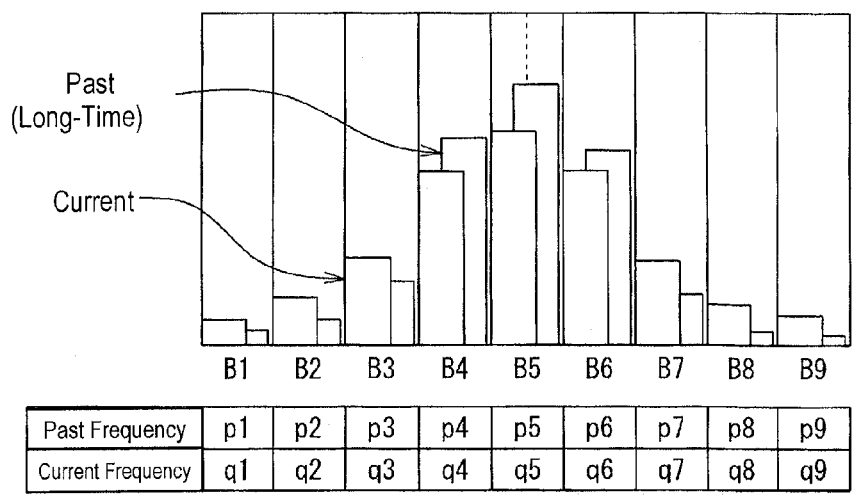
FIG. 11 is a diagram illustrating the method for computing the relative entropy.

The above is the method for computing the steering angle predicted error distribution as the running state distribution. In addition, the difference between the distributions is computed as follows. That is, the relative entropy RHp is determined from the past (or the long-time) steering angle predicted error distribution 1 and the current steering angle predicted error distribution 2. As shown in FIG. 11, the relative entropy RHp is the difference (the distance) between the current steering angle predicted error distribution 2 and the past (or the long-time) steering angle predicted error distribution 1. The relative entropy RHp is computed using the following listed computing Equation (Equation 7).

(Equation 7)

$$RHp = \sum q_i \cdot \log_g \frac{q_i}{p_i}. \qquad 1$$

Here, when the probability pi of the past (or the long-time) steering angle predicted error distribution 1 is equal to the probability qi of the current steering angle predicted error distribution 2, one has RHp equal to 0, and, as the difference between the probability pi and the probability qi becomes the larger, the value of RHp becomes the larger.

The range of the predicted error class bi for computing the past (or the long-time) steering angle predicted error distribution 1 or the current steering angle predicted error distribution 2 may be set based on the value of a adopted in computing the steering entropy value Hp representing the ambiguity (the uncertainty) of the steering error distribution. Here, the a value is determined as follows: based on the time-series data of the steering angle, the steering error within a prescribed time, that is, the difference between the determined value of the steering angle, when an assumption is made that the steering is carried out smoothly, and the actual steering angle is determined, and the distribution (the dispersion) in the steering error is measured, followed by computing of the 90 percentile value (the range of distribution containing 90% of the steering error).

Here, the α value is computed based on the past or the long-time steering error distribution; from the computed a value, the same range of the predicted error class bi is set for the past (or the long-time) steering angle predicted error distribution 1 and the current steering angle predicted error distribution 2. FIG. 9 is a diagram illustrating the range of the steering angle predicted error θe of the predicted error classes bi set using the α value.

Operation, etc.

When the normal driving characteristics of the driver can be realized based on the running time from start of data collection, the steering entropy method is adopted to compute the instability.

In this case, the difference between the first running state distribution representing the driving characteristics of the driver in the normal case and the second running state distribution representing the recent driving characteristics is computed; from the magnitude of the difference, the unstable driving state is determined. As a result, it is possible to detect the unstable running state with a high degree of precision independent of the difference in the traffic environment. That is, a highly precise detection can be made of the unstable state corresponding to the individual normal characteristics and independent of the difference in the traffic environment.

In this case, although only the steering angle information (the running state data) for evaluating the instability of the driver due to the operation of the driver is to be detected, a disturbance may take place in the steering operation in the driving state with changes in the steering state caused by either the intentional steering by the driver or by the road environment. When the steering angle information containing such a disturbance is adopted to determine the running state distribution for use, the detection precision of the driving instability may degrade. Particularly, the time range of the second running state distribution is short, so that the time range is prone to the influence by the driving state described above.

On the other hand, for the running state distribution computing section 130 of this embodiment, when the driving state determination section 120 determines that the driving state is the prescribed driving state, the second running state distribution described above is computed without using the running state data when the prescribed driving state is determined. More specifically, when a determination is made that the state is the prescribed driving state, corresponding to the driving state, with the first running state distribution or with the third running state distribution containing no running state data when the prescribed driving state described above is determined, the second running state distribution is overwritten, that is, substituted, and a determination is made that the driving is unstable. As a result, it is possible to prevent an incorrect detection of the driving unstable state under the influence of the prescribed driving state.

According to the present embodiment, based on the prescribed driving state, in the second driving state, the first running state distribution is adopted, and, in the first driving state, the third running state distribution is adopted to substitute the second running state. In this way, it is possible to change the running state distribution corresponding to the driving state. That is, when the detected driving state is the first driving state, that is, when an assumption is made that the driving state of the driver continues around the period in which the prescribed driving state is determined, the third running state distribution determined in the third time range preceding generation of the corresponding first driving state is substituted to the second running state. As a result, it is possible to determine that the state preceding the generation of the first driving state is an unstable state. In this case, by substituting the running state data when the corresponding first driving state takes place by the running state data preceding the first driving state, the running state data that caused the incorrect detection can be removed. More specifically, the data exchange is carried out in the units of the third time range.

On the other hand, when the detected driving state is the second driving state, that is, when an assumption is made that the driving state of the driver changes around the period when a determination is made that that the driving state is the prescribed driving state, the second running state distribution acquired before the generation of the second driving state cannot be adopted. Consequently, the second running state distribution is substituted by the first running state distribution with a relatively longer time interval, and the second running state distribution is reset. In this case, because the first running state distribution and the second running state distribution are in agreement with each other, the relative entropy becomes "0." In this case, one may also adopt a scheme in which the data collection for the second running state distribution is newly started from the start of the third time range after the end of the generation of the second driving state.

In the period of the lapse of the second time range from the end of the determination of the first driving state among the prescribed driving states, the second running state distribution is computed from both the running state data in the time range before the determination of the first driving state and the running state data in the time interval after end of the determination of the first driving state. The sum of the time interval before determining the prescribed driving state and the time interval after the determination of the prescribed driving state is equal to the time of the second time range described above.

For the prescribed driving state (the first driving state) generated due to driving with a prescribed road environment, even when a prescribed driving state with disturbed steering angle information takes place, an assumption is made that the driving state of the driver before the generation of the prescribed driving state continues after the disappearance of the prescribed driving state. Consequently, it is possible to correctly determine the second running state from the data around the generation of the first driving state right after determination of the first driving state.

On the other hand, when the driving state is determined to be the second driving state among the prescribed driving states, it is quite possible that the reliability of the steering operation information before the determination of the second driving state is also low, so that without using the information preceding the determination of the second driving state, the information is reset, and counting is carried out for the timer after the end of the second driving state. Only after the lapse of the time of the second time range can high-precision computing be carried out for the second running state distribution.

Also, when the prescribed driving state takes place in practice, there is a time lag before determination (the detection) is made on the prescribed driving state. In consideration of this time lag, according to the present embodiment, the information display is carried out only when the state determined by the driving instability determination section 140 to be the driving instability continues for a preset time. As a result, it is possible to suppress the incorrect detection caused by the lag in the detection of the prescribed driving state. The time of the continuation described above may be set to be a time longer than the detection lag of the driving state.

MODIFIED EXAMPLES

In the following, the first modified example will be explained. In the above explanation of the first embodiment, as an example, the steering angle information is adopted as the running state data, and the steering angle predicted error distribution is adopted as the running state distribution. However, the running state data and the running state distribution are not limited to those presented in the example described above. As described in Japanese Laid-Open Patent Application No. 2009-524342, one may also adopt the running state data and the running state portion. Here, the driving state data are taken as an index representing the operation characteristics.

That is, the driving supporting section 100A detects the accelerator pedal operation amount as the running state data; using the detected accelerator pedal operation amount, the accelerator pedal position entropy representing the instability of the accelerator pedal operation by the driver described above is computed.

One may also adopt a scheme in which the driving supporting section 100A adopts the tolerance time between the vehicle and the preceding vehicle when the accelerator pedal is released as the running state data.

As another scheme that may be adopted, the driving supporting section 100A adopts the lane changing time when the vehicle gets out of the current driving lane when the correction steering maneuvering is carried out as the running state data.

As another scheme that may be adopted, the driving supporting section 100A adopts the vehicle speed when the driving supporting section runs alone as the running state data.

As another scheme that may be adopted, the driving supporting section 100A adopts the highest acceleration when the vehicle moves ahead as the running state data.

As another scheme that may be adopted, the driving supporting section 100A adopts the shortest tolerance time between the vehicle and the preceding vehicle when the brake operation is carried out as the running state data.

As another scheme that may be adopted, the driving supporting section 100A adopts the shortest inter-vehicle distance between the vehicle and the preceding vehicle during passing as the running state data.

In the following, the second modified example will be explained. The basic configuration of the second modified example is the same as that of the first embodiment described above. However, in this modified example, the driving supporting section 100A adopts the inter-vehicle information between the vehicle and the preceding vehicle (the inter-vehicle time or the inter-vehicle distance) when the vehicle follows the preceding vehicle in driving as the running state data. In this case, by computing the running state distribution from the distribution of the inter-vehicle distance, it is possible to compute the driving instability.

The method for computing in this case is as follows. From the average value and the standard deviation of the inter-vehicle distance in 2 different time ranges, a distribution of the inter-vehicle distance, assuming the Gaussian distribution is prepared, and the proportion of the preset inter-vehicle distance proportion (such as on the outer left side over 1 σ) is computed as the difference. The well-known computing scheme as that described in Japanese Laid-Open Patent Application No. 2009-524342 may be adopted for this computing method.

When the state with the difference over the preset threshold lasts over a preset time, an alarm or other information display may be issued.

According to the second modified example, the driving state determination section 120 acquires the operation information from the accelerator pedal operation when accelerator pedal operation is carried out over a preset rate, the brake pedal operation when the brake pedal operation is carried out over a preset rate, and the blinker operation. In addition, the driving state determination section 120 acquires the road environment information from the case of the another vehicle cutting in front of the vehicle, the change of the type of highway, the section preset to contain the toll gate, and the traffic jam information.

In addition, in the second modified example, the driving state determination section 120 determines the prescribed driving state by detecting the accelerator pedal operation carried out over a preset rate, the brake pedal operation carried out over a preset rate, the another vehicle cutting in front of the vehicle, the change of the type of highway, the section preset to contain the toll gate, and the traffic jam information.

When the inter-vehicle time is adopted as the running state data, as shown in FIG. 13, the driving state determination section 120 sets the first driving state and the second driving state.

Here, the accelerator pedal operation or brake pedal operation carried out over a preset rate is determined from the differential value of the detected value of the accelerator pedal position sensor 1 and the brake pedal operation amount sensor 2.

The another vehicle cutting in front of the vehicle is determined by detecting the preceding vehicle with the preceding vehicle detecting device 9. In this case, the vehicle is equipped with a camera for taking pictures of the front side as the preceding vehicle detecting device 9.

The change in the type of highway is determined according to the road information from, for example, the "vehicle position information and the navigation system." Also, it is possible to determine the change in the type of highway by detecting the change of the lane based on the steering angle, etc.

The traffic jam information is determined by, for example, road-vehicle communication.

As shown in FIG. 13, the operation information based on the accelerator pedal operation carried out over a preset rate, the brake pedal operation carried out over a preset rate, and the blinker operation are taken as the second driving state. On the other hand, the another vehicle cutting in front of the vehicle, the change of the type of highway, the section preset to include the toll gate, and the road environment information of the traffic jam information are taken as the first driving state.

In the following, the third modified example will be explained. The basic configuration of the third modified example is the same as that of the first embodiment as described above.

Figure 14:
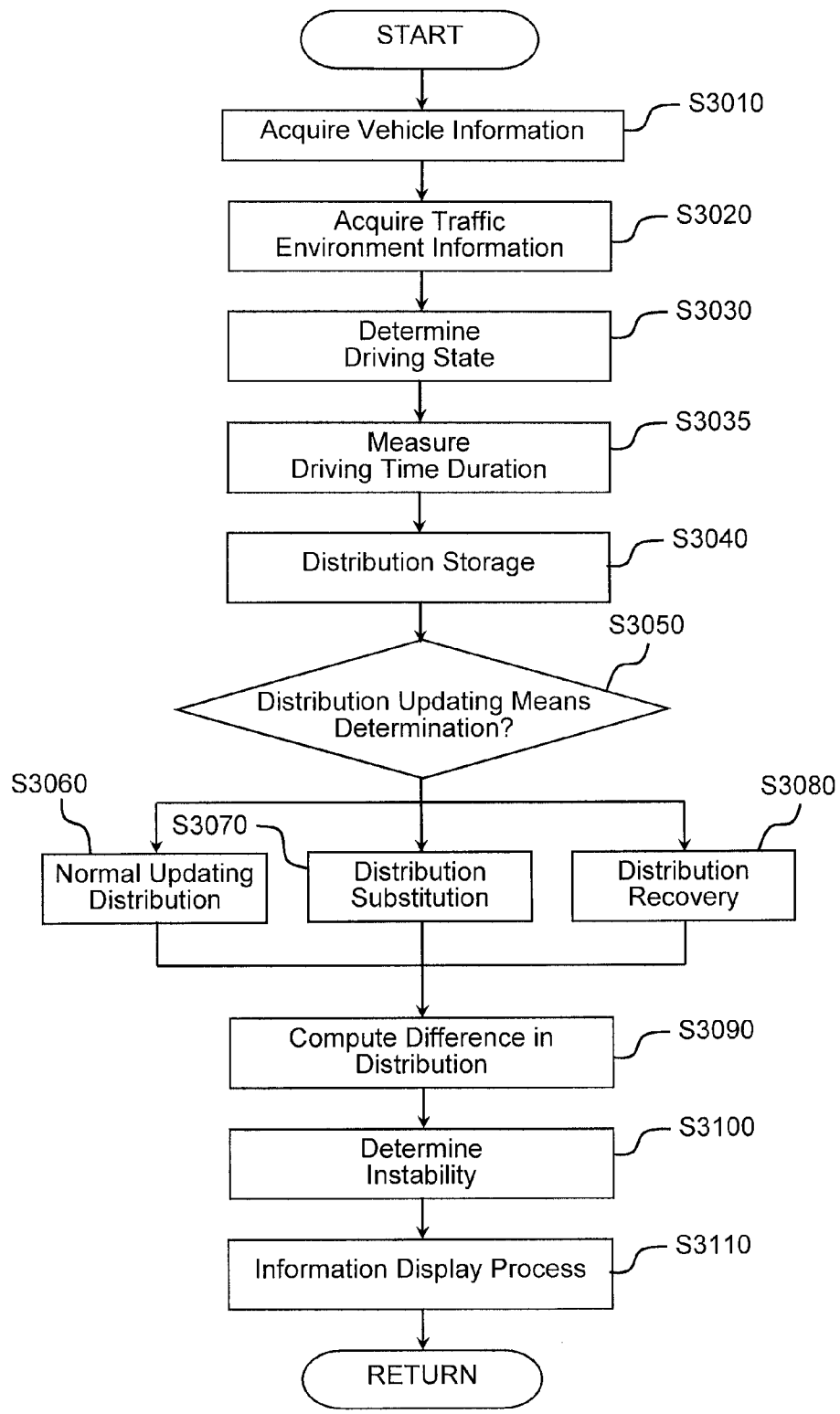
FIG. 14 is a diagram illustrating the treatment of the driving supporting section related to the third modified example of the present invention.

FIG. 14 is a diagram illustrating the process carried out by the driving supporting section 100A in the third modified example. As shown in FIG. 14, the process of the driving supporting section 100A is the same as the process of the driving supporting section 100A in the first embodiment shown in FIG. 3.

More specifically, the process of the steps S3010 to S3030 is the same as the process of the steps S1010 to S1030. The process of the steps S3040 to S3110 is basically the same as the process of the steps S1040 to S1110.

However, according to this modified example, the process of the step S3035 is added. In step S3035, when a determination has been made that, in step S3030, the driving state is the first driving state or the second driving state, the counting of time starts for the time counter. On the other hand, when a detection is not made in step S3030 that the driving state is the first driving state or the second driving state, the time counter is reset to zero.

In the case of the first driving state in which the time counted by the time counter is longer than a preset time, and the driving state being carried out is the first driving state, as shown in the column of changes in FIG. 15, the first driving state is taken as the second driving state. This determination may also be carried out in step S3050, etc.

Even when an assumption is made that the driving characteristics of the driver around the first driving state are continued, if the first driving state lasts longer than a preset time, it is quite possible that the driving characteristics of the driver are changed around the first driving state. Consequently, when the first driving state lasts longer than the preset time, the state is taken as the second driving state.

Here, when the second driving state lasts shorter than the preset time, the second operation state may also be taken as the first driving state. In the case of a shorter time of the operation, the driver may make an incorrect operation. In such case, an assumption is made that the driving characteristics of the driver around the second driving state continue.

Effects of the Embodiments

The following is a description of the effects of the aforementioned embodiment and the modified examples.

(1) The running state acquisition section 110 acquires the running state data comprising the operation state of the driving operation unit that can be operated by the driver and/or the vehicle state. Based on the running state data acquired by the running state acquisition section 110, the running state distribution computing section 130 computes the second running state distribution of the preset second time range and the first running state distribution of the preset second time range longer than the second time range. The driving instability determination section 140 compares the first running state distribution and the second running state distribution computed by the running state distribution computing section described above, so as to determine the instability of the driving state. Based on the operation state of the driving operation unit that can be operated by the driver, the vehicle state, and/or the information of the periphery of the vehicle, the driving state determination section 120 determines whether the current driving state is the prescribed driving state as the driving state generated due to the operation of the preset prescribed driving operation unit and/or the driving state generated due to driving in a preset prescribed road environment. When the driving state determination section 120 described above determines the state as the prescribed driving state, the running state distribution computing section 130 excludes the running state data described above in the period where the corresponding prescribed driving state is determined and computes at least the second running state distribution from the first running state distribution and the second running state distribution described above. With this configuration, the low-precision running state data are not adopted. Consequently, it is possible to improve the precision in detecting the driving no instability.

(2) In the period until the lapse of the second time range from the end of the determination of the second driving state, the running state distribution computing section 130 computes the second running state distribution from the two running state data, namely, the running state data in the time interval preceding the determination of the prescribed driving state and the running state data after the end of the determination of the prescribed driving state. The sum of the running state data in the time interval preceding the determination of the prescribed driving state and the running state data after end of the determination of the prescribed driving state is equal to the time of the second time range described above. With this configuration, it is possible to make a highly precise determination of the second running state after the end of the prescribed driving state.

(3) When the driving state determination section 120 described above determines the prescribed driving state caused by driving in a prescribed road environment, the running state distribution computing section 130 excludes the running state data described above in the period determined to have the corresponding prescribed driving state and computes the second running state distribution described above. With this configuration, the second running state distribution with a shorter time interval is prone to influence of the driving state. However, in this way, by considering the driving state, it is possible to improve the precision of the second running state.

(4) The running state distribution computing section 130 computes the second running state distribution from the running state data in the time interval after the determination of the prescribed driving state and the time interval after the determination of the prescribed driving state is equal to the second time range described above. With this configuration, it is possible to compute the second running state distribution without using the data in the prescribed driving state.

(5) When the driving state determination section determines that the state is the driving state generated as the prescribed driving operation unit is operated, the running state distribution computing section 130 excludes the running state in the period where the prescribed driving state is determined and computes the second running state distribution described above. With this configuration, although the second running state distribution with a shorter time interval is prone to the influence of the driving state, the data of the prescribed driving state are not in use for sure, so that the precision of the second running state distribution can be improved.

(6) When the driving state determination section 120 determines the prescribed driving state generated due to driving in a prescribed road environment, the running state distribution computing section 130 computes the second running state distribution from both the running state data in the time interval preceding the determination of the prescribed driving state and the running state data in the time interval after the determination of the prescribed driving state in the period until the lapse of the time of the second time range after end of the determination of the second driving state; the running state distribution computing section then sets the sum of the running state data in the time interval preceding the determination of the prescribed driving state and the running state data in the time interval after the determination of the prescribed driving state to be equal to the second time range described above. When the driving state determination section determines the prescribed driving state generated due to the operation of the prescribed driving operation unit, the driving state determination section 120 computes the second running state distribution from the running state data in the time interval after the determination of the prescribed driving state and sets the time interval after the determination of the prescribed driving state to be equal to the time of the second time range. With this configuration, it is possible to compute the second running state appropriately corresponding to the prescribed driving state.

(7) The operation of the prescribed driving operation unit is at least one operation of the lane change operation, the acceleration operation, the braking operation, the shift operation, and the operation of the navigation system. As a result, it is possible to determine the prescribed driving state based on the driving operation.

(8) The road environment described above refers to at least one road environment of the road surface state, such as in a tunnel, the merging/branching of roads, a curved road, near a toll gate, the another vehicle cutting in front of the vehicle, the type of highway, and a traffic jam. As a result, it is possible to determine the prescribed driving state based on the road environment.

(9) For the running state distribution, the operation amount of the steering operation is computed as the running state data. As detection is made from the steering operation that requires continuous operation, the driving state can be detected with a high degree of precision.

(10) Computing the difference from the operation amount of the steering operation described above is carried out using the steering entropy method. By using the steering entropy, the detection performance can be expected to be improved.

(11) For the running state distribution described above, the inter-vehicle information with respect to the preceding vehicle is computed as the running state data. By detecting from the variation in the vehicle detecting time where the information can be acquired continuously, it is possible to detect the driving state with a high degree of precision.

(12) For computing the difference from the inter-vehicle information described above, the difference is computed from the magnitude of the proportion of the preset inter-vehicle time. By using the magnitude of the proportion of the inter-vehicle time, the detection performance can be expected to be improved.

Here, an explanation has been made on the limited number of embodiments. However, the scope of the claims is not limited to them. Various modifications of the disclosed embodiments will be apparent to those skilled in the art.

The invention claimed is:

1. A driving instability determination device comprising:
a running state acquisition section that acquires running state data pertaining to at least one of an operation state of a driver operate driving operation unit and a vehicle state;
a running state distribution computing section that computes a first running state distribution of a first time range and a second running state distribution of a preset second time range based on the running state data acquired by the running state acquisition section, the first time range being longer than the second time range;
an operation instability determination section that compares the first running state distribution and the second running state distribution computed by the running state distribution computing section to determine a driving instability; and
a driving state determination section that determines whether a current driving state is a prescribed driving state, which is estimated to degrade reliability of the running state data acquired by the running state acquisition section, based on at least one of the driving state of the driver operate driving operation unit, the vehicle state and vehicle periphery information,
the running state distribution computing section being configured to exclude the running state data in a period that the prescribed driving state is determined to exist, and then compute at least the second running state distribution among the first running state distribution and the second running state distribution.

2. The driving instability determination device according to claim 1, wherein
until the second time range lapses after the determination of the prescribed driving state existing, the running state distribution computing section computes the second running state distribution from both the running state data acquired in a time interval preceding the determination of the prescribed driving state and the running state data acquired in a time interval after the determination of the prescribed driving state, and the running state distribution computing section sets a sum of the running state data in the time interval preceding the determination of the prescribed driving state existing and the running state data in the time interval after the determination of the prescribed driving state existing as being equal to the time of the second time range.

3. The driving instability determination device according to claim 2, wherein
the driving state determination section determines the driving state as corresponding to the prescribed driving state upon detecting that the vehicle is being driven in a prescribed road environment.

4. The driving instability determination device according to claim 3, wherein
the operation of the prescribed driving operation unit corresponds to at least one of a lane change operation, an acceleration operation, a braking operation, a shift operation and an operation of the navigation device.

5. The driving instability determination device according to claim 3, wherein
the running state distribution is obtained by computing an operation amount of a steering operation as the running state data.

6. The driving instability determination device according to claim 3, wherein
the running state distribution is obtained by computing inter-vehicle information with respect to a preceding vehicle as the running state data.

7. The driving instability determination device according to claim 2, wherein
the running state distribution is obtained by computing an operation amount of a steering operation as the running state data.

8. The driving instability determination device according to claim 7, wherein
the computing of the operation amount of the steering operation is obtained by using a steering entropy method.

9. The driving instability determination device according to claim 2, wherein
the running state distribution is obtained by computing inter-vehicle information with respect to a preceding vehicle as the running state data.

10. The driving instability determination device according to claim 9, wherein
the computing of the inter-vehicle information is obtained by computing a magnitude of a proportion of a preset inter-vehicle time.

11. The driving instability determination device according to claim 1, wherein
the running state distribution computing section computes a second running state distribution from the running state data in a time interval after the determination of the prescribed driving state existing and sets the time interval after the determination of the prescribed driving state existing as being equal to the second time range.

12. The driving instability determination device according to claim 11, wherein
the running state determination section determines the driving state as the prescribed driving state upon detecting operation of a prescribed driving operation unit that is set in advance.

13. The driving instability determination device according to claim 12, wherein
the prescribed road environment corresponds to at least one of a road surface state, within a tunnel, a merging/branching portion of roads, a curved road, a toll gate area, a another vehicle cutting in front of the vehicle, a highway type and a traffic jam state.

14. The driving instability determination device according to claim 12, wherein
the prescribed road environment corresponds to at least one of a road surface state, within a tunnel, a merging/branching portion of roads, a curved road, a toll gate area, a another vehicle cutting in front of the vehicle, a highway type and a traffic jam state.

15. The driving instability determination device according to claim 1, wherein
the driving state determination section determines the driving state as the first prescribed driving state upon detecting traveling in a prescribed road environment that is set in advance, and determines the driving state as the second prescribed driving state upon detecting operation of a prescribed driving operation unit that is set in advance;
upon determining that the driving state is the first prescribed driving state during a period until the second time range lapses after the determination of the prescribed driving state existing, the running state distribution computing section computes the second running state distribution from both the running state data in a time interval preceding the determination of the first prescribed driving state and the running state data in a time interval after the determination of the first prescribed driving state, and the running state distribution computing section sets a sum of the running state data in the time interval preceding the determination of the first prescribed driving state existing and the running state data in the time interval after the determination of the first prescribed driving state existing as being equal to the time of the second time range;
upon determining that the driving state is the driving state is the second prescribed driving state from the running state data of the time interval after the determination of the prescribed driving state exiting, the second running state distribution is computed, and the time interval after end of the determination of the prescribed driving state is set as being equal to the time of the second time range.

16. The driving instability determination device according to claim 15, wherein
the operation of the prescribed driving operation unit corresponds to at least one of a lane change operation, an acceleration operation, a braking operation, a shift operation and an operation of the navigation device.

17. The driving instability determination device according to claim 1, wherein
the running state distribution is obtained by computing an operation amount of a steering operation as the running state data.

18. The driving instability determination device according to claim 17, wherein
the computing of the operation amount of the steering operation is obtained by using a steering entropy method.

19. The driving instability determination device according to claim 1, wherein
the running state distribution is obtained by computing inter-vehicle information with respect to a preceding vehicle as the running state data.

20. The driving instability determination device according to claim 19, wherein
the computing of the inter-vehicle information is obtained by computing a magnitude of a proportion of a preset inter-vehicle time.

* * * * *